May 5, 1931.  G. E. PURPLE  1,803,354
BELT FASTENER
Filed June 19, 1929

Witness:
William P. Kilroy

Inventor:
George E. Purple
Joseph Harris
His Atty.
By

Patented May 5, 1931

1,803,354

UNITED STATES PATENT OFFICE

GEORGE E. PURPLE, OF LA GRANGE, ILLINOIS, ASSIGNOR TO FLEXIBLE STEEL LACING COMPANY, OF CHICAGO, ILLINOIS, A CORPORATION OF ILLINOIS

BELT FASTENER

Application filed June 19, 1929. Serial No. 372,090.

This invention relates to improvements in belt fasteners, and more particularly, belt fasteners of the plate type designed especially for heavy duty belts.

One object of my invention is to provide simple, efficient and extremely rugged fasteners for the adjacent ends of power-transmitting belts, the fasteners being characterized by the fact that they will withstand great tension from the belt ends without danger of buckling or distortion and without injury to the belts.

Another object of the invention is to provide belt fasteners of the plate type wherein the two adjacent ends of a belt are gripped between two clamping plates proper bolted or otherwise fastened to the belt ends, the clamping plates proper being each reinforced by a bracing plate so constructed as to effectively prevent opening up of the belt-receiving jaw or mouth formed between the clamping plates proper when the belt is under tension.

Other and more specific objects of the invention are: to provide a fastening of the type indicated which does not require any special cutting or preparation of the belt ends other than the punching of holes to receive the securing bolts; to provide novel and highly efficient means on the clamping plates proper for biting into the leather or other material of which the belt may be constituted, to prevent slippage, while at the same time avoiding any detrimental cutting, tearing or rupture of the fibers of the belt; and to so construct the fasteners at the points adjacent the tangent or main stretches or reaches of the belt as to prevent tearing or gouging of the belt from "whipping" when the belt is running under load.

Other objects of the invention will more clearly appear from the description and claims hereinafter following.

Figure 1:
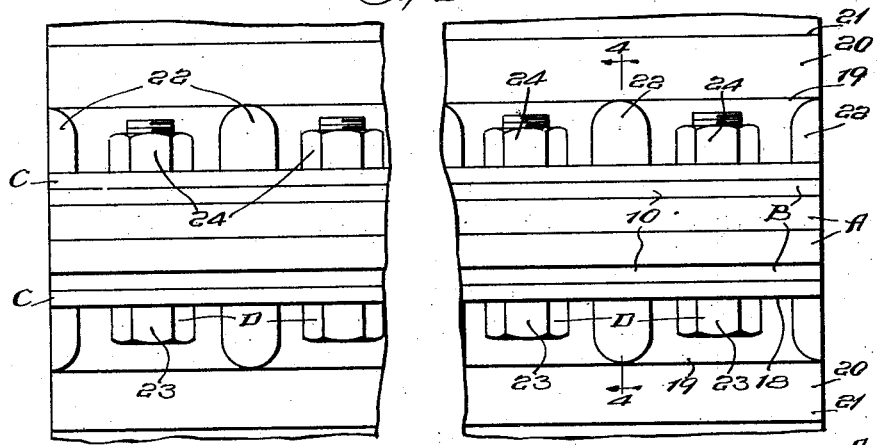
Figure 2:
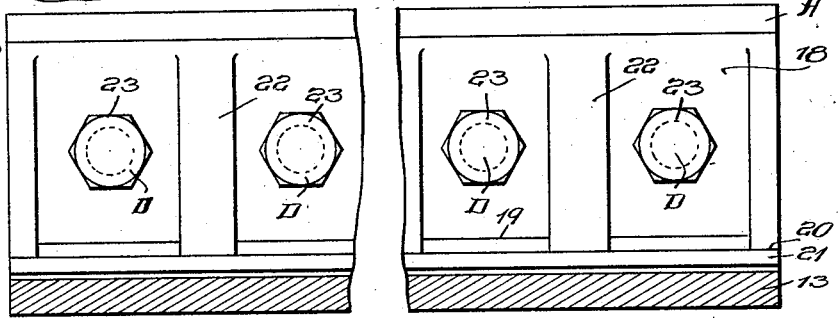
Figure 3:
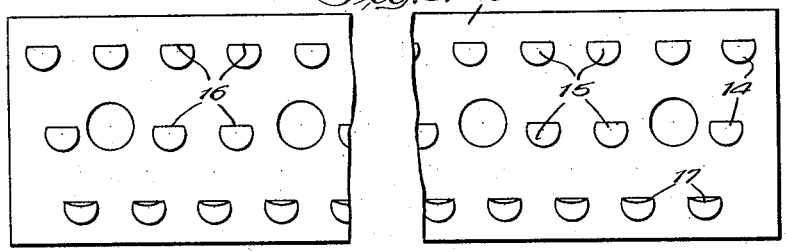
Figure 4:
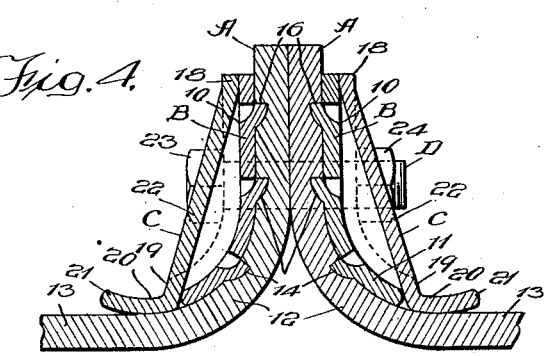
Figure 5:
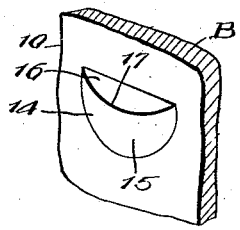

In the drawing forming a part of this specification, Figure 1 is a broken top plan view of portions of a belt showing the adjacent ends thereof secured together by my improved fastener. Figure 2 is a broken, part vertical section view, part elevational view of the structure illustrated in Figure 1. Figure 3 is a broken, face elevational view of the inner or active face of one of my improved clamping plates proper. Figure 4 is a vertical sectional view through the adjacent ends of a belt showing my fastener applied thereto and corresponding to the section line 4—4 of Figure 1. And Figure 5 is a perspective view of a fragment of one of the clamping plates illustrating more particularly the novel formation of one of the gripping knobs.

In said drawing, the ends of the belt are indicated at A—A, the two clamping plates proper at B—B; the two bracing or reinforcing plates at C—C; and the securing bolts at D—D.

Each of the clamping plates B, which are of like construction, is of the proper length corresponding to the width of the belt and has a vertical section 10 and an inner curved section 11, the latter conforming to the natural curvature of that portion of the belt end indicated at 12 between the main sections or reaches 13 of the belt and the outturned end. On its inner face, each plate B is provided with, preferably three series of knobs or teeth 14—14, extending longitudinally of the plate and the knobs of one series being staggered vertically with reference to those of the other series, as best indicated in Figure 3. The knobs 14 are of special construction, the same preferably being punched or stamped out from the main plate B approximately in the form of a portion of a spherical surface, so as to provide a rounded face 15 and a segmental flat upper face 16, the latter being so disposed as to be presented against the fibers of the belt ends to resist movement of the latter, as will be clear from an inspection of Figure 4. Preferably, also, the arcuate edge 17 of each knob or tooth will be slightly rounded so as to avoid the formation of a sharp cutting edge. With the formation of the knobs or teeth 14 as above indicated, it is evident that the same will be pressed into the ends of the belt, as clearly shown in Figure 4, without danger of cutting the fibers of the belt, and will present a series of shoulders so arranged as to effectively prevent pulling out of the belt ends from between the plates B, when the belt is under tension. The depth of the knobs 14 will also preferably be such as to be appreciably less than the thickness of the belt material but of sufficient depth to be embedded approximately one-third or one-half the thickness of the belt material.

Each of the plates C, which are of like construction, is of a length corresponding to the length of the clamping plate proper B and has its upper edge terminated preferably flush with the upper edge of the plate B, as shown in Figure 4. Each plate C has the main portion thereof, indicated at 18, conformed to the back or outer side of the plate B for the full width of the latter, as best indicated by the dotted outlines in Figure 4. At its lower end, that is, nearest the main reaches of the belt, each plate C is formed with an offset, as indicated at 19, so as to bring the lower flange 20 of the plate C in alinement with the lower curved section 11 of the plate B and thereby form, in effect, a continuation of the plate B to provide a more extensive bearing on the belt, on the curved portion thereof.

As also clearly shown in Figure 4, the extreme edge portions 21 of the flanges of the plates C are curved on a somewhat shorter radius than the natural curvature of the belt section 12, so as to leave the extreme edge 21 normally slightly spaced from the tangent or main section 13 of the belt. This is done to prevent the corner edges of the plates C from gouging into the belt when the latter is whipped up and down while running, it being obvious that there will be no injury occasioned to the belt at this point because of the construction described.

In order that the plates C may effectively perform their bracing or reinforcing functions for the plates B and without adding excessive weight, each of the plates C is formed with a plurality of ribs or corrugations 22—22 spaced lengthwise of the plate C and extending in planes perpendicular to the plane of the main sections of the belt, as best shown in Figure 4. From the latter figure, it will also be observed that the crests of said corrugations or ribs are extended from the top edge to the bottom edge of the plate B and thereby form, in effect, struts for the plate B and thus minimize any tendency for the lower portions of the plates B to be pulled apart when the belt is under tension.

The plates B and C are provided with suitable openings spaced longitudinally of the plates to accommodate the bolts D and preferably these openings and the bolts D are located approximately in the line where the curved sections 12 of the belt come into full back to back contact, as shown in Figure 4. The bolts D are of suitable form and of sufficient strength to effectively clamp the parts together, each bolt D having a head 23 and a nut 24, the bolts being located preferably midway between the ribs of the plates C.

From the preceding description, it will be seen that a very strong and effective fastener is provided for heavy duty belts; pulling out of the belt ends is effectively prevented and without danger of rupturing the fibers of the belt; the clamping plates proper are effectively braced against distortion; injury to the belt from whipping is avoided; and no special preparation of the belt end is required, other than the punching of the necessary holes for the bolts.

In the drawing I have shown the plates B and C in the form of stamped and pressed plates but it will be obvious to those skilled in the art that the invention may be carried out in plates of other types and, further, that the clamping plates proper may be reinforced or braced in other manner than by the use of separate backing plates C. All such modifications are contemplated as come within the scope of the claims appended hereto.

I claim:

1. In a fastener for the ends of a belt arranged back to back, the combination with two clamping plates proper disposed on opposite sides of the backed ends; of separate backing plates detachably fitted against the outer sides of the clamping plates, the backing plates being substantially co-extensive with the clamping plates in a direction transverse of the belt; and securing means extending through all of the plates and the belt ends.

2. In a fastener for the ends of a belt arranged back to back, the combination with two clamping plates proper disposed on opposite sides of the backed ends; of separate backing plates bearing against the outer faces of the clamping plates, the backing plates having integrally formed strengthening ribs extending crosswise of the plates, the backing plates extending substantially from end to end of the clamping plates; and securing means extending through all of said plates.

3. In a fastener for the ends of a belt arranged back to back, the combination with two clamping plates proper adapted to be disposed on the opposite sides of the backed ends, each of the clamping plates having a rounded inner edge to thereby provide a flaring mouth for the reception of the belt ends; of separable backing plates for the clamping plates, the backing plates being substantially co-extensive with the clamping plates in a direction transverse of the belt; and securing means extending through all of the plates.

4. In a fastener for the ends of a belt arranged back to back, the combination with two clamping plates proper adapted to be disposed on the opposite sides of the backed ends, each of the clamping plates having a rounded inner edge to thereby provide a flaring mouth for the reception of the belt ends; of backing plates for the clamping plates, the backing plates being of greater width than the clamping plates and likewise rounded at their inner ends and having the rounded portions thereof extended beyond the inner edges of the clamping plates, said extended ends of the backing plates being alined with the inner ends of the clamping plates to thereby form, in effect, a continuation thereof; and means for securing all of the plates to the belt ends.

5. In a fastener for the ends of a belt, the combination with opposed clamping plates, each of said plates having on its face, adapted to engage the belt end, a plurality of knobs, the knobs being formed with rounded surfaces and a plane surface, the latter being presented toward the end edge of the belt; and means for clamping said plates to the belt ends.

6. In a fastener for the ends of a belt arranged back to back, the combination with means in the form of plates disposed on the opposite sides of the belt ends for clamping the latter, said plates being curved along their inner edges to conform to the curvature of the belt ends entered therebetween, the extreme inner edges of the plates being more curved outwardly away from and adapted to be normally spaced from the main tangent portions of the belt whereby to prevent gouging of the plate edges into the belt when the latter is whipped while in motion.

7. In a fastener for belt ends arranged back to back, the combination with two clamping plates proper, each rounded along its inner portion and provided on its inner face with a plurality of knobs adapted to be embedded in the belt ends; of separate backing plates, each having a plurality of ribs therein extending transversely of the backing plates, the ribs being of such length as to substantially extend from one edge to the other edge of the corresponding clamping plate proper; and securing means extending through the plates.

8. In a fastener for the ends of a belt arranged back to back, the combination with two clamping plates proper, rounded at their inner ends and provided on their opposed faces with a plurality of knobs adapted to be embedded into the belt ends; of separate backing plates conforming to the clamping plates, the backing plates having curved flanges along their inner edges forming extensions of the curved portions of the inner ends of the clamping plates, said backing plates being also integrally corrugated; and securing devices extended through the plates.

9. In a fastener for the ends of a belt, arranged back to back, the combination with two clamping plates proper adapted to be disposed on the opposite sides of the backed ends, each of the clamping plates having a rounded inner edge to thereby provide a flaring mouth for the reception of the belt ends; of a backing plate fitted against the outer face of each of the clamping plates, each of said backing plates having also a rounded inner edge; and securing means extending through all of the plates.

In witness that I claim the foregoing I have hereunto subscribed my name this 7th day of June, 1929.

GEORGE E. PURPLE.